United States Patent [19]

Matsumoto et al.

[11] Patent Number: 5,369,196
[45] Date of Patent: Nov. 29, 1994

[54] PRODUCTION PROCESS OF OLEFIN BASED POLYMERS

[75] Inventors: Junichi Matsumoto; Takuji Okamoto; Masami Watanabe; Nobuhide Ishihara, all of Sodegaura, Japan

[73] Assignee: Idemitsu Kosan Co., Ltd., Tokyo, Japan

[21] Appl. No.: 916,119

[22] PCT Filed: Nov. 29, 1991

[86] PCT No.: PCT/JP91/01658
§ 371 Date: Aug. 20, 1992
§ 102(e) Date: Aug. 20, 1992

[87] PCT Pub. No.: WO92/09640
PCT Pub. Date: Jun. 11, 1992

[30] Foreign Application Priority Data

Nov. 30, 1990 [JP] Japan ............... 2-329539
Apr. 9, 1991 [JP] Japan ............... 3-103754

[51] Int. Cl.$^5$ .................................. C08F 4/64
[52] U.S. Cl. .......................... 526/127; 526/160; 526/351; 526/352; 526/348.2; 502/104
[58] Field of Search ............ 526/127, 160, 170

[56] References Cited
U.S. PATENT DOCUMENTS

| | | | |
|---|---|---|---|
| 4,634,687 | 1/1987 | Fujita et al. | 502/121 |
| 4,897,455 | 1/1990 | Welborn, Jr. | 526/129 |
| 5,023,304 | 6/1991 | Takeuchi et al. | 526/160 |
| 5,026,798 | 6/1991 | Canich | 526/127 |
| 5,064,802 | 11/1991 | Stevens et al. | 502/155 |
| 5,132,262 | 7/1992 | Rieger et al. | 502/117 |
| 5,132,381 | 7/1992 | Winter et al. | 526/160 |
| 5,153,157 | 10/1992 | Hlatky et al. | 502/117 |
| 5,162,278 | 11/1992 | Razavi | 502/152 |

Primary Examiner—Joseph L. Schofer
Assistant Examiner—David Wu
Attorney, Agent, or Firm—Oblon, Spivak, McClelland, Maier & Neustadt

[57] ABSTRACT

A process for effectively producing an alpha-olefin homopolymer or copolymer of two or more of alpha-olefins without using a great amount of an aluminum compound, is disclosed. In the process for producing a cyclic olefin based polymer according to the present invention, homopolymerization of an alpha-olefin or copolymerization of two or more of alpha-olefins is effected in the presence of a catalyst comprising, as main ingredients, the following Compounds (A), (B) and (C):

(A) a transition metal compound;
(B) a compound capable of forming an ionic complex when reacted with a transition metal compound; and
(C) an organoaluminum compound.

3 Claims, 3 Drawing Sheets

PRODUCTION PROCESS OF OLEFIN BASED POLYMERS

TECHNICAL FIELD

The present invention relates to a production process of an olefin based polymer, and more particularly to a process for effectively producing a homopolymer of an alpha-olefin or a copolymer of two or more of alpha-olefins.

BACKGROUND ART

Heretofore, the Kaminsky type catalysts containing a transition metal compound and aluminoxane have been known as a soluble olefin polymerization catalyst. For example, the following catalysts are known. In the alpha-olefin polymerization, a catalyst composed of a zirconium compound and aluminoxane shows high polymerization activity (Japanese Patent Application Unexamined Publication No. Sho 58-19309). Stereo-regular polypropylene is produced using a catalyst composed of a zirconium compound having a ligand in which two indenyl groups are connected through an ethylene group, and aluminoxane (JP Pat. Appln. Unexamined Pub. No. Sho 61-130314). It is said that using these Kaminsky type catalysts, for example in the propylene polymerization, any of isotactic polypropylene, atactic polypropylene and syndiotactic polypropylene can be produced (Macromol. Chem., Rapid Commun. 4,417–421 (1983); Angew. Chem. Int. Ed. Engl. 24,507–508 (1985); J. Am. Chem. Soc. 109,6544–6545 (1987); and J. Am. Chem. Soc. 110,6255–6256 (1988)).

In this case, as a transition metal compound useful for producing isotactic polypropylene, a transition metal compound having an ethylene bis(indenyl) ligand (JP Pat. Appln. Unexamined Pub. No. Sho 61-264010; Sho 64-51408; and Sho 64-66216); R(C5(R')4)2MeQp type metallocene compound reported by Ewen et al (JP Pat. Appln. Unexamined Pub. No. Sho 63-251405; Sho 63-295607; and Sho 64-74202); a metallocene compound cross-linked with silicon or the like (JP Pat. Appln. Unexamined Pub. No. Hei 3-12406); and the like are known. Further, a metallocene compound useful for producing a stereo-block polymer is known (JP Pat. Appln. Unexamined Pub. No. Sho 63-142004 and Sho 63-2005).

However, the above-mentioned polymerization methods require use of a great amount of expensive aluminoxane which is 100 to 10,000 times the amount of a transition metal compound to obtain sufficient activity. Further, due to use of a great amount of aluminoxane, a substantial amount of metal will remain in the polymerized products, resulting in deterioration and coloring of the products. In these processes, after polymerization, deashing treatment of the resultant products should be sufficiently conducted. Thus, these processes have a problem in productivity.

Further, aluminoxane is produced from the reaction of highly reactive trimethylaluminum and water, leading to risks. Furthermore, the reaction product is a mixture of several materials containing unreacted materials, and it is quite difficult to isolate one single substance. Thus, management of catalysts to obtain a product having stable physical properties is quite difficult.

On the other hand, JP Pat. Appln. PCT Pub. No. Hei 1-502036 discloses a polymerization process for producing an alpha-olefin polymer using, as a catalyst, a specific boron complex containing ammonium and a metallocene compound. However, the catalyst shows extremely low polymerization activity and thus is not suitable for industrial use.

Further, syndiotactic polyolefins, particularly syndiotactic polypropylene (SPP) are known. However, there are some problems in all conventional processes for producing syndiotactic polyolefins.

For example, it is known that SPP can be produced at $-78°$ C. using a catalyst system composed of $VCl_4$, anisole and dibutylaluminum chloride (By B. Lotz et al, Macromolecules 21, 1988, 2375). However, the polymerization temperature is extremely low. Also, the stereo-regularity of the resultant product and the yield are extremely low.

Further, it is known that SPP can be obtained, at a drastically improved yield, at $25°$ to $70°$ C. using a catalyst composed of isopropylidene(cyclopentadienyl)(9-fluorenyl)zirconium dichloride and methylaluminoxane (By J. A. Ewen et al., J. Am. Chem. Soc., 110, 1988, 6255). However, the SPP obtained in this process has low molecular weight.

Further, it is known that SPP having high molecular weight can be produced using [phenyl(methyl)methylene](9-fluorenyl)(cyclopentadienyl)zirconium dichloride or diphenylmethylene(9-fluorenyl)(cyclopentadienyl)zirconium dichloride, and methylaluminoxane (JP Pat. Appln. Unexamined Pub. No. Hei 2-274703). However, in this process, a great amount of expensive aluminoxane against a transition metal compound should be employed.

Accordingly, a process for producing syndiotactic polyolefin in an industrially effective way at high yield, has not yet been found.

DISCLOSURE OF THE INVENTION

The present invention was made in view of the above-mentioned situations, and has an object of providing a process for effectively producing a homopolymer of an alpha-olefin or a copolymer of two or more of alpha-olefins without using a great amount of an organoaluminum compound.

To achieve the above object, the present invention provides a process for producing an olefin based polymer wherein homopolymerization of an alpha-olefin or copolymerization of alpha-olefins is carried out in the presence of a catalyst comprising, as main components, the following compounds (A), (B) and (C):

(A) a transition metal compound;
(B) a compound capable of forming an ionic complex when reacted with a transition metal compound; and
(C) an organoaluminum compound.

In this case, if the following compound (A1) is used as Compound (A), olefin based polymers can be effectively produced, without using a special compound, on an industrial scale. Transition metal compound represented by the following Formula (A1):

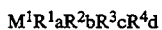

$$M^1 R^1{}_a R^2{}_b R^3{}_c R^4{}_d$$

wherein $M^1$ is a transition metal; $R^1$, $R^2$, $R^3$ and $R^4$ may be the same as or different from each other, and are independently a ligand having a sigma bond, chelate ligand or Lewis base; and a, b, c and d are independently an integer of 0 to 4.

Further, olefin based polymers can be produced using a catalyst only comprising this compound (A1) and the above-mentioned Compound (B) as main components.

Furthermore, if the following compound (A2) is used as Compound (A), high-molecular-weight syndiotactic polyolefins having high syndiotacticity can be effectively produced without using a great amount of an organoaluminum compound. Transition metal compound (A2) represented by the following Formula:

$$(Cp^1-Ae-Cp^2)M^1R^1fR^2g$$

wherein $Cp^1$ is a cyclopentadienyl group or substituted cyclopentadienyl group; $Cp^2$ is a fluorenyl group or substituted fluorenyl group; A is a bridge based on a covalent bond, and each A may be the same or different from each other; e is an integer of 0 to 6; $M^1$ is a transition metal selected from the IVB Group of the Periodic Table; $R^1$ and $R^2$ may be the same as or different from each other, and are independently a ligand having a sigma bond, chelate ligand or Lewis base; and f and g are independently an integer of 0 to 2.

In addition, a catalyst for olefin polymerization comprising, a specific metallocene catalyst containing a cyclopentadienyl group and alkyl aluminum has been proposed (EPC Publication No. 0426638; JP Pat. Appln. Unexamined Pub. No. Hei 3-207704). However, the catalysts disclosed in the above publications are different from those used in the present invention in that a transition metal compound is limited to a dialkyl metallocene compound containing a biscyclopentadienyl group; aluminum compound are limited to trimethyl aluminum and triethylaluminum; and aluminoxane is excluded from aluminum compound used.

BEST EMBODIMENTS FOR CARRYING OUT THE INVENTION

Figure 1:
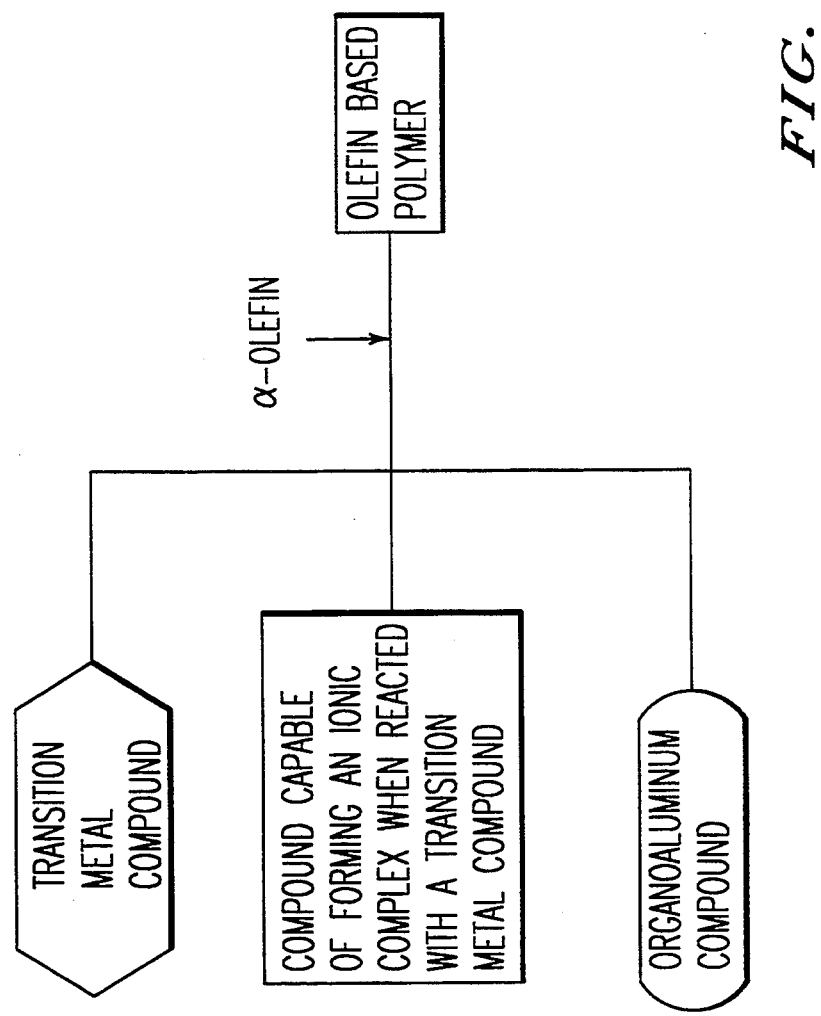
FIG. 1 shows the flowchart of the production process of the present invention.

The present invention will be described in more detail below. In addition, FIG. 1 shows the production process according to the present invention.

In the present invention, a transition metal compound is used as Compound (A). The transition metal compounds include, for example, those containing a transition metal belonging to the IVB, VB, VIB, VIIB and VIII Groups of the Periodic Table. More specifically, as the above transition metals, preferred are titanium, zirconium, hafnium, chromium, manganese, nickel, palladium and platinum. Of these, more preferred are zirconium, hafnium, titanium, nickel and palladium.

These transition metal compounds include a variety of compounds, particularly include those containing a transition metal belonging to the IVB and VIII Groups of the Periodic Table, more suitably a transition metal of the IVB Group, i.e., titanium (Ti), zirconium (Zr) or hafnium (Hf). More preferred are cyclopentadienyl compounds represented by the following Formula (I), (II) or (III), or derivatives thereof, or compounds represented by the following Formula (IV) or derivatives thereof.

$$CpM^1R^1aR^2bR^3c \qquad (I)$$

$$Cp_2M^1R^1aR^2b \qquad (II)$$

$$(Cp-Ae-Cp)M^1R^1aR^2b \qquad (III)$$

$$M^1R^1aR^2bR^3cR^4d \qquad (IV)$$

In Formulas (I) to (IV), $M^1$ is a Ti, Zr or Hf atom; Cp is a group containing an unsaturated cyclic hydrocarbon group such as a cyclopentadienyl group, substituted cyclopentadienyl group, indenyl group, substituted indenyl group, tetrahydroindenyl group, substituted tetrahydroindenyl group, fluorenyl group or substituted fluorenyl group; $R^1$, $R^2$, $R^3$ and $R^4$ are independently a hydrogen atom, oxygen atom, halogen atom, $C_{1-20}$ alkyl group, $C_{1-20}$ alkoxy group, $C_{6-20}$ aryl group, $C_{6-20}$ aryloxy group alkylaryl group or arylalkyl group, $C_{1-20}$ acyloxy group, allyl group, substituted allyl group, a ligand having a sigma bond such as a substituent containing a silicon atom, chelate ligand such as an acetylacetonate group and substituted acetylacetonate group or Lewis base ligand; A is a bridge based on a covalent bond, and may be the same as or different from each other; a, b, c and d are independently an integer of 0 to 4; e is an integer of 0 to 6; and two or more of $R^1$, $R^2$, $R^3$ and $R^4$ may form a ring. If the above-mentioned Cp has any substituent, the substituent is preferably a $C_{1-20}$ alkyl group. In Formulas (II) and (III), two of Cp may be the same as or different from each other.

In the above Formulas (I) to (III), the substituted cyclopentadienyl groups include, for example, a methylcyclopentadienyl group, ethylcyclopentadienyl group, isopropylcyclopentadienyl group, 1,2-dimethylcyclopentadienyl group, tetramethylcyclopentadienyl group, 1,3-dimethylcyclopentadienyl group, 1,2,3-trimethylcyclopentadienyl group, 1,2,4-trimethylcyclopentadienyl group, pentamethylcyclopentadieyl group and trimethylsilylcyclopentadienyl group. Examples of $R^1$ to $R^4$ in the above Formulas (I) to (IV), include halogen atoms such as a fluorine atom, chlorine atom, bromine atom and iodine atom; $C_{1-20}$ alkyl groups such as a methyl group, ethyl group, n-propyl group, isopropyl group, n-butyl group, octyl group and 2-ethylhexyl group; $C_{1-20}$ alkoxy groups such as a methoxy group, ethoxy group, propoxy group, butoxy group: $C_{6-20}$ aryloxy groups such as a and phenoxy group; $C_{6-20}$ aryl groups, alkylaryl groups or arylalkyl group, such as a phenyl group, tolyl group, xylyl group and benzyl group; $C_{1-20}$ acyloxy groups such as a heptadecylcarbonyloxy group; substituents containing a silicon atom such as a trimethylsilyl group and (trimethylsilyl)methyl group; Lewis bases such as ethers including dimethyl ether, diethyl ether and tetrahydrofuran, thioethers including tetrahydrothiophen, esters including ethylbenzoate, nitriles including acetonitrile and benzonitrile, amines including trimethylamine, triethylamine, tributylamine, N, N-dimethylaniline, pyridine, 2,2'-bipyridine and phenantholorine, and phosphines including triethylphosphine and triphenylphosphine; chain unsaturated hydrocarbons such as ethylene, butadiene, 1-pentene, isoprene, pentadiene, 1-hexene unsaturated cyclic hydrocarbons such as benzene, toluene, xylene, cycloheptatriene, cyclooctadiene, cyclooctatriene, cyclooctatetraene and derivatives thereof. The bridges based on a covalent bond, A in the above Formula (III) include, for example, a methylene bridge, dimethylmethylene bridge, ethylene bridge, 1,1'-cyclohexylene bridge, dimethylsilylene bridge, dimethylgelmylene bridge and dimethylstannylene bridge.

More specifically, these compounds include the following compounds, and those having titanium or hafnium instead of zirconium.

Compounds of Formula (I):
(Pentamethylcyclopentadienyl)trimethylzirconium,
(pentamethylcyclopentadienyl)triphenylzirconium,
(pentamethylcyclopentadienyl)tribenzylzirconium,
(pentamethylcyclopentadienyl)trichlorozirconium,
(pentamethylcyclopentadienyl)trimethoxyzirconium,
(cyclopentadienyl)trimethylzirconium,
(cyclopentadienyl)triphenylzirconium,
(cyclopentadienyl)tribenzylzirconium,
(cyclopentadienyl)trichlorozirconium,
(cyclopentadienyl)trimethoxyzirconium,
(cyclopentadienyl)dimethyl(methoxy)zirconium,
(methylcyclopentadienyl)trimethylzirconium,
(methylcyclopentadienyl)triphenylzirconium,
(methylcyclopentadienyl)tribenzylzirconium,
(methylcyclopentadienyl)trichlorozirconium,
(methylcyclopentadienyl)dimethyl(methoxy)zirconium,
(dimethylcyclopentadienyl)trichlorozirconium,
(trimethylcyclopentadienyl)trichlorozirconium,
(trimethylsilylcyclopentadienyl)trimethylzirconium,
(tetramethylcyclopentadienyl)trichlorozirconium, Compounds of Formula (II):
Bis(cyclopentadienyl)dimethylzirconium,
bis(cyclopentadienyl)diphenylzirconium,
bis(cyclopentadienyl)diethylzirconium,
bis(cyclopentadienyl)dibenzylzirconium,
bis(cyclopentadienyl)dimethoxyzirconium,
bis(cyclopentadienyl)dichlorolzirconium,
bis(cyclopentadienyl)dihydridezirconium,
bis(cyclopentadienyl)monochloromonohydridezirconium,
bis(methylcyclopentadienyl)dimethylzirconium,
bis(methylcyclopentadienyl)dichlorozirconium,
bis(methylcyclopentadienyl)dibenzylzirconium,
bis(pentamethylcyclopentadienyl)dimethylzirconium,
bis(pentamethylcyclopentadienyl)dichlorozirconium,
bis(pentamethylcyclopentadienyl)dibenzylzirconium,
bis(pentamethylcyclopentadienyl)chloromethylzirconium,
bis(pentamethylcyclopentadienyl)hydridemethylzirconium,
(cyclopentadienyl)(pentamethylcyclopentadienyl)dichlorozirconium.

Compounds of Formula (III):
Ethylenebis(indenyl)dimethylzirconium,
ethylenebis(indenyl)dichlorozirconium,
ethylenebis(tetrahydroindenyl)dimethylzirconium,
ethylenebis(tetrahydroindenyl)dichlorozirconium,
dimethylsilylenebis(cyclopentadienyl)dimethylzirconium,
dimethylsilylenebis(cyclopentadienyl)dichlorozirconium,
isopropyl(cyclopentadienyl)(9-fluorenyl)dimethylzirconium,
isopropyl(cyclopentadienyl)(9-fluorenyl)dichlorozirconium,
[phenyl(methyl)methylene](9-fluorenyl)(cyclopentadienyl)dimethylzirconium,
diphenylmethylene(cyclopentadienyl)(9-fluorenyl)dimethylzirconium,
ethylidene(9-fluorenyl)(cyclopentadienyl)dimethylziroconium,
cyclohexylidene(9-fluorenyl)(cyclopentadienyl)dimethylzirconium,
cyclopentylidene(9-fluorenyl)(cyclopentadienyl)dimethylzirconium,
cyclobutylidene(9-fluorenyl)(cylcopentadienyl)dimethylzirconium,
dimethylsilylene(9-fluorenyl)(cyclopentadienyl)dimethylzirconium,
dimethylsilylenebis(2,3,5-trimethylcyclopentadienyl)dichlorozirconium,
dimethylsilylenebis(2,3,5-trimethylcyclopentadienyl)dimethylzirconium,
dimethylsilylenebis(indenyl)dichlorozirconium.

Further, compounds other than the cyclopentadienyl compound represented by Formula (I), (II) or (III) can be used. Examples of such compounds include those compounds represented Formula (IV) [Compound (A1)], such as tetramethylzirconium, tetrabenzylzirconium, tetramethoxyzirconium, tetraethoxyzirconium, tetrabutoxyzirconium, tetrachlorozirconium, tetrabromozirconium, butoxytrichlorozirconium, dibutoxydichlorozirconium, bis(2,5-di-t-butylphenoxy)dimethylzirconium, bis(2,5-di-t-butylphenoxy)dichlorozirconium and zirconium bis(acetylacetonate).

In the present invention, olefin based polymers can be produced in the presence of a catalyst comprising as main components this Compound (A1) and Compound (B), without using Compound (C).

Further, in the present invention, as Compound (A), a IVB Group transition metal compound having a ligand which is a multidentate ligand compound wherein two substituted or unsubstituted conjugated cycloalkadienyl groups (provided that at least one group is a substituted cycloalkadienyl group) are connected to each other through an element selected from the IVA Groups of the Periodic Table, can be preferably used. Using this compound, isotactic polyolefins having high isotacticity, high molecular weight and high melting point can be produced.

Such compounds include, for example, those represented by the following Formula (V) or their derivatives.

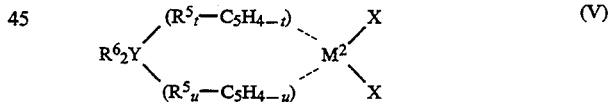 (V)

In Formula (V), Y is a carbon, silicon, germanium or tin atom; and $R^5{}_t$—$C_5H_{4-t}$ and $R^5{}_u$—$C_5H_{4-u}$ are independently a substituted cyclopentadienyl group; t and u are an integer of 1 to 4. $R^5$ is a hydrogen atom, silyl group or hydrocarbon group, and may be the same as or different from each other. Further, in at least one cyclopentadienyl ring, $R^5$ is connected to at least one carbon atom located next to a carbon atom connected to Y. $R^6$ is a hydrogen atom, $C_{1-20}$ alkyl group, $C_{6-20}$ aryl group, alkylaryl group or arylalkyl group. $M^2$ is a Ti, Zr or Hf atom. X is a hydrogen atom, halogen atom, $C_{1-20}$ alkyl group, $C_{6-20}$ aryl group, alkylaryl group or arylalkyl group, or $C_{1-20}$ alkoxy group. X may be the same as or different from each other and two $R^6$ are the same as or different from each other.

In Formula (V), the substituted cycopentadienyl groups include, for example, a methylcyclopentadienyl group, ethylcyclopentadienyl group, isopropylcyclopentadienyl group, 1,2-dimethylcyclopentadienyl group, 1,3-dimethylcyclopentadienyl group, 1,2,3-trimethylcyclopentadienyl group and 1,2,4-trimethylcyclopentadienyl group. Examples of X include halogen atoms such as a fluorine atom, chlorine atom, bromine atom and iodine atom; $C_{1-20}$ alkyl groups such as a methyl group, ethyl group, n-propyl group, isopropyl group, n-butyl group, octyl group and 2-ethylhexyl group; $C_{1-20}$ alkoxy groups such as a methoxy group, ethoxy group, propoxy group, butoxy group and phenoxy group; and $C_{6-20}$ aryl groups, alkylaryl groups or arylalkyl groups, such as a phenyl group, tolyl group, xylyl group and benzyl group. Examples of $R^6$ are, for example, a methyl group, ethyl group, phenyl group, tolyl group, xylyl group and benzyl group.

These compounds (V) include, for example, the following compounds, and those having titanium or hafnium instead of zirconium. Dimethylsilylenebis(2,3,5-trimethylcyclopentadienyl)zirconium dichloride, dimethylsilylenebis(2,3,5-trimethylcyclopentadienyl)hafnium dichloride.

In the present invention, syndiotactic polyolefins having high syndiotacticity and high molecular weight can be produced by using the following compound (A2) of the above Formula (III) as the transition metal compound (A). Compound (A2) represented by the following Formula (VI):

$$(Cp^1-A_e-Cp^2)M^1R^1{}_fR^2{}_g \qquad (VI)$$

wherein $Cp^1$ is a cyclopentadienyl group or substituted cyclopentadienyl group; $Cp^2$ is a fluorenyl group or substituted fluorenyl group; A is a bridge based on a covalent bond; e is an integer of 0 to 6; $M^1$ is a transition metal slected from the IVB Group of the Periodic Table; $R^1$ and $R^2$ may be the same as or different from each other, and are independently a ligand having a sigma bond, chelate ligand or Lewis base; and f and g are independently an integer of 0 to 2.

In the Compound (A2), the substituted cyclopentadienyl group ($Cp^1$) includes, for example, a methylcyclopentadienyl group, ethylcyclopentadienyl group, isopropylcyclopentadienyl group, 1,2-dimethylcyclopentadienyl group, tetramethylcyclopentadienyl group, 1,3-dimethylcyclopentadienyl group, 1,2,3-trimethylcyclopentadienyl group, 1,2,4-trimethylcyclopentadienyl group, pentamethylcyclopentadieyl group and trimethylsilylcyclopentadienyl group.

The substituted fluorenyl group ($Cp^2$) includes, for example, alkyl fluorenyl groups such as 2-methylfluorenyl group and 3,6-dimethylfluorenyl group.

The substituents contained in the substituted cyclopentadienyl groups are preferably alkyl groups having 1 to 6 carbon atoms. The number of the substituents attached may be selected from an integer of 1 to 4. Further, the substituents contained in the substituted fluorenyl groups are preferably alkyl groups having 1 to 6 carbon atoms. The number of the substituents attached may be selected from an integer of 1 to 4.

The bridges based on a covalent bond, A include, for example, a methylene bridge, dimethylmethylene bridge, ethylene bridge, dialkylsilylene bridge (alkyl having 1 to 4 carbon atoms) such as a dimethylsilylene bridge, dimethylgelmylene bridge, dimethylstannylene bridge, diphenylmethylene bridge, phenylmethylmethylene bridge, cyclohexylidene bridge, cyclopentylidene bridge, cyclobutylene bridge, methylcyclohexylidene bridge, isopropylmethylmethylene bridge and t-butylmethylmethylene bridge.

$M^1$ is a transition metal selected from the IVB Group of the Periodic Table, i.e., titanium (Ti), zirconium (Zr), hafnium (Hf) or the like.

$R^1$ and $R^2$ are independently a ligand having a sigma bond, a chelate ligand or a Lewis base ligand, such as a hydrogen atom, halogen atom, $C_{1-20}$ alkyl group, $C_{1-20}$ alkoxy group, $C_{6-20}$ aryl group, $C_{6-20}$ aryloxy group alkylaryl group or arylalkyl group, $C_{1-20}$ acyloxy group, allyl group, substituted allyl group, acetylacetonate group, substituted acetylacetonate group, substituent having a silicon atom, carbonyl, oxygen molecule, nitrogen molecule, Lewis base, chain unsaturated hydrocarbon, or cylic unsaturated hydrocarbon. $R^1$ and $R^2$ may connect with each other to form a ring.

Examples of $R^1$ and $R^2$ include as a halogen atom F, Cl, Br and I; $C_{1-20}$ alkyl groups such as a methyl group, ethyl group, n-propyl group, isopropyl group, n-butyl group, octyl group and 2-ethylhexyl group; $C_{1-20}$ alkoxy groups such as a methoxy group, ethoxy group, propoxy group, butoxy group $C_{6-20}$ aryloxy groups such as a phenoxy group; $C_{6-20}$ aryl groups, alkylaryl groups or arylalkyl group, such as a phenyl group, tolyl group, xylyl group and benzyl group; $C_{1-20}$ acyloxy groups such as a heptadecylcarbonyloxy group; substituents containing a silicon atom such as a trimethylsilyl group and (trimethylsilyl)methyl group; Lewis bases such as ethers including dimethyl ether, diethyl ether and tetrahydrofuran, thioethers including tetrahydrothiophen, esters including ethylbenzoate, nitriles including acetonitrile and benzonitrile, amines including trimethylamine, triethylamine, tributylamine, N, N-dimethylaniline, 2,2'-bipyridine and phenantholorine, and phosphines including triethylphosphine and triphenylphosphine; chain unsaturated hydrocarbons such as ethylene, butadiene, 1-pentene, isoprene, pentadiene, 1-hexene; unsaturated cyclic hydrocarbons such as benzene, toluene, xylene, cycloheptatriene, cyclooctadiene, cyclooctatriene, cyclooctatetraene.

More specifically, these compounds (A2) include the following compounds, and those having titanium or hafnium instead of zirconium:
(Arylalkylidene)(9-fluorenyl)(cyclopentadienyl)zirconium dimethyl, (diarylmehtylene)(9-fluorenyl)(cyclopentadienyl)zirconium dimethyl, (cycloalkylidene)(9-fluorenyl)(cyclopentadienyl)zirconium dimethyl,
(dialkylmethylene)(9-fluorenyl)(cyclopentadienyl)-zirocnium dimethyl, (dialkylsilylene)(9-fluorenyl)-(cyclopentadienyl)zirconium dimethyl and (dialkylmethylene)(9-fluorenyl)(cyclopentadienyl)zirconium dichloride. Particularly suitable compounds are [methyl(phenyl)methylene](9-fluorenyl)(cyclopentadienyl)zirconium dimethyl,
(diphenylmethylene)(9-fluorenyl)(cyclopentadienyl)-zirconium dimethyl, ethylene(9-fluorenyl)(cyclopentadienyl)zirconium dimethyl, (cyclohexylidene)(9-fluorenyl)(cyclopentadienyl)zirconium dimethyl, (cyclopentylidene)(9-fluorenyl)(cyclopentadienyl)-zirconium dimethyl,
(cyclobutylidene)(9-fluorenyl)(cyclopentadienyl)zirconium dimethyl and (dimethylsilylene)(9-fluorenyl)-(cyclopentadienyl)zirconium dimethyl.

In the present invention, Compound (A2) which can be preferably used may have Bridge A containing at least one substituent which is not a methyl group, particularly bridges represented by the following Formula (VII):

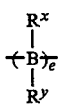

(VII)

wherein B is a carbon, silicon, germanium or tin atom; $R^x$ and $R^y$ may be same as or different from each other, and are independently a hydrogen atom, halogen atom, hydrocarbon atom or alkoxy group, provided that at least one of $R^x$ and $R^y$ is not a methyl group; and $R^x$ and $R^y$ may form a ring. If these compounds are used as Compound (A2), the resultant homopolymers or copolymers may have high molecular weight and narrow molecular weight distribution.

In addition, among transition metal compounds (A), the transition metal compounds containing a transition metal belonging to the VIII Group of the Periodic Table, include chromium compounds such as tetramethylchromium, tetra(t-butoxy)chromium, bis(cyclopentadienyl)chromium and hydridetricarbonyl(cyclopentadienyl)chromium; manganese compounds such as tricarbonyl(cyclopentadienyl)manganese, pentacarbonylmethylmanganese, bis(cyclopentadienyl)manganese and manganese bis(acetylacetonate); nickel compounds such as dicarbonylbis(triphenylphosphine)nickel, dibromobis(triphenylphosphine)nickel, dinitrogenbis(bis(tricyclohexylphosphine)nickel) and chlorohydridebis(tricyclohexylphosphine)nickel; and palladium compounds such as dichlorobis(benzonitrile)palladium, carbonyltris(triphenylphosphine)palladium, dichlorobis(triethylphosphine)palladium and bis(isocyanated t-butyl)palladium.

Further, Compounds (B) are not particularly limited to, but include any compounds capable of forming an ionic complex when reacted with the transition metal compound (A). The suitable compounds as Compounds (B) include a compound comprising a cation and an anion wherein a plurality of functional groups are connected to an element, particularly a coordination complex compound comprising a cation and an anion wherein a plurality of covalently coordinated groups are connected to an element selected from the Groups of VB, VIB, VIIB, VIII, IB, IIB, IIIA, IVA and VA of the Periodic Table. The suitable compounds comprising a cation and an anion wherein a plurality of covalently coordinated groups are connected to an element, include, for example, those represented by the following Formula (VIII) or (IX):

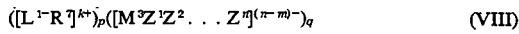

(VIII)

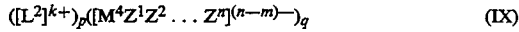

(IX)

wherein $L^2$ is $M^5$, $R^8R^9M^6$, $R^{10}_3C$ or $R^{11}M^6$. In Formula (VIII) or (IX), $L^1$ is a Lewis base; $M^3$ and $M^4$ are independently an element selected from the groups of VB, VIB, VIIB, VIII, IB, IIB, IIIA, IVA and VA, preferably IIIA, IVA and VA, of the Periodic Table; $M^5$ and $M^6$ are independently an element selected from the groups of IIIB, IVB, VB, VIB, VIIB, VIII, IA, IB, IIA, IIB and VIIA of the Periodic Table; $Z^1$ to $Z^n$ are independently a hydrogen atom, dialkylamino group, $C_{1-20}$ alkoxy group, $C_{6-20}$ aryloxy group, $C_{1-20}$ alkyl group, $C_{6-20}$ aryl group, alkylaryl group or arylalkyl group, $C_{1-20}$ halogenated hydrocarbon group, $C_{1-20}$ acyloxy group, organometalloid group or halogen atom; two or more of $Z^1$ to $Z^n$ may form a ring; $R^7$ is a hydrogen atom, $C_{1-20}$ alkyl group, $C^{6-20}$ aryl group, alkylaryl group or arylalkyl group; $R^8$ and $R^9$ are independently a cyclopentadienyl group, substituted cyclopentadienyl group, indenyl group or fluorenyl group; $R^{10}$ is a $C^{1-20}$ alkyl group, aryl group, alkylaryl group or arylalkyl group; $R^{11}$ is a large ring ligand such as tetraphenylporphyrin and phthalocyanine; m is a valency of $M^3$ and $M^4$ and is an integer of 1 to 7; n is an integer of 2 to 8; k is an ion value number of $[L^1-R^7]$ and $[L^2]$, and is an integer of 1 to 7; and p is an integer of at least 1; and q is specified by the formula: $q=(p \times k)/(n-m)$.

Examples of the above Lewis bases are amines such as ammonia, methylamine, aniline, dimethylamine, diethylamine, N-methylaniline, diphenylamine, trimethylamine, triethylamine, tri-n-butylamine, N,N-dimethylaniline, methyldiphenylamine, pyridine, p-bromo-N,N-dimethylaniline and p-nitro-N,N-dimethylaniline; phosphines such as triethylphosphine, triphenylphosphine and diphenylphosphine; ethers such as dimethyl ether, diethyl ether, tetrahydrofuran and dioxane; thioethers such as diethyl thioethers and tetrahydrothiophene; and esters such as ethylbenzoate. Examples of $M^3$ and $M^4$ are, for example, B, Al, Si, P, As and Sb, preferably B and P. Examples of $M^5$ are Li, Na, Ag, Cu, Br, I and $I_3$. Examples of $M^6$ are Mn, Fe, Co, Ni and Zn. Examples of $Z^1$ to $Z^n$ include dialkylamino groups such as a dimethylamino group and diethylamino group; $C_{1-20}$ alkoxy groups such as a methoxy group, ethoxy group and n-butoxy group; $C_{6-20}$ aryloxy groups such as phenoxy group, 2,6-dimethylphenoxy group and naphthyloxy group; $C_{1-20}$ alkyl groups such as a methyl group, ethyl group, n-propyl group, iso-propyl group, n-butyl group, n-octyl group and 2-ethylhexyl group; $C_{6-20}$ aryl, alkylaryl or arylalkyl groups, such as a phenyl group, p-tolyl group, benzyl group, 4-t.-butylphenyl group, 2,6-dimethylphenyl group, 3,5-dimethylphenyl group, 2,4-dimethylphenyl group, 2,3-dimethylphenyl group; $C_{1-20}$ halogenated hydrocarbon groups such as p-fluorophenyl group, 3,5-difluorophenyl group, pentachlorophenyl group, 3,4,5-trifluorophenyl group, pentafluorophenyl group, 3,5-di(trifluoromethyl)phenyl group; halogen atoms such as F, Cl, Br and I; and organometalloid groups such as a pentamethylantimony group; trimethylsilyl group, trimethylgelmyl group, diphenylarsine group, dicyclohexylantimony group and diphenylboron group. Examples of $R^7$ and $R^{10}$ are the same as above. Examples of substituted cyclopentadienyl groups represented by $R^8$ and $R^9$ include those substituted with an alkyl group such as a methylcyclopentadienyl group, butylcyclopentadienyl group and pentamethylcyclopentadienyl group. Usually, the alkyl groups have 1 to 6 carbon atoms and the number of substituted alkyl groups is an integer of 1 to 5. In Formula (VIII) or (IX), $M^3$ and $M^4$ are preferably boron.

Of those compounds represented by Formula (VIII) or (IX), the following compounds can be particularly used as preferred ones.

Compounds Represented by Formula (VIII):

Triethylammonium tetraphenylborate, tri(n-butyl)ammonium tetraphenylborate, trimethylammonium tetraphenylborate, tetraethylammonium tetraphenylborate, methyltri(n-butyl)ammonium tetraphenylborate, benzyltri(n-butyl)ammonium tetraphenylborate, dimethyldiphenylammonium tetraphenylborate, methyltriphenylammonium tetraphenylborate, trimethylanilinium tetraphenylborate, methylpyridinium tetraphenylborate, benzylpyridinium tetraphenylborate, methyl(2-cyanopyridinium) tetraphenylborate, trimethylsulfonium tetraphenylborate, benzyldimethylsulfonium tetraphenylborate, triethylammonium tetrakis(pentafluorophenyl)borate, tri(n-butyl)ammonium tetrakis(pentafluorophenyl)borate, triphenylammonium tetrakis(pentafluorophenyl)borate, tetrabutylammonium tetrakis(pentafluorophenyl)borate, tetraethylammonium tetrakis(pentafluorophenyl)borate, methyltri(n-butyl)ammonium tetrakis(pentafluorophenyl)borate, benzyltri(n-butyl)ammonium tetrakis(pentafluorophenyl)borate, methyldiphenylammonium tetrakis(pentafluorophenyl)borate, methyltriphenylammonium tetrakis(pentafluorophenyl)borate, dimethyldiphenylammonium tetrakis(pentafluorophenyl)borate, anilinium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, dimethyl(m-nitroanilinium) tetrakis(pentafluorophenyl)borate, dimethyl(p-bromoanilinium) tetrakis(pentafluorophenyl)borate, pyridinium tetrakis(pentafluorophenyl)borate, p-cyanopyridinium tetrakis(pentafluorophenyl)borate, N-methylpyridinium tetrakis(pentafluorophenyl)borate, N-benzylpyridinium tetrakis (pentafluorophenyl)borate, O-cyano-N-mehtylpyridinium tetrakis(pentafluorophenyl)borate, p-cyano-N-methylpyridinium tetrakis(pentafluorophenyl)borate, p-cyano-N-benzylpyridinium tetrakis(pentafluorophenyl)borate, trimethylsulfonium tetrakis(pentafluorophenyl)borate, benzyldimethylsulfonium tetrakis(pentafluorophenyl)borate, triphenylphosphonium tetrakis(pentafluorophenyl)borate, tetraphenylphosphonium tetrakis(pentafluorophenyl)borate, dimethylanilinium tetrakis(3,5-ditrifluoromethylphenyl)borate, and hexafluoroarsenic acid triethylammonium.

Compounds Represented by Formula (IX):

Ferrocenium tetraphenylborate, silver tetraphenyl borate, trityl tetraphenylborate, tetraphenylporphyrin manganese tetraphenylborate, ferrocenium tetrakis(pentafluorophenyl)borate, 1,1'-dimethylferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrin manganese tetrakis(pentafluorophenyl)borate, tetra(pentafluorophenyl)boric acid (tetraphenylporphyrin iron chloride), tetrakis(pentafluorophenyl)boric acid (tetraphenylporphyrin zinc), tetrafluorosilver borate, hexafluoroarsenical silver, and hexafluorosilver antimonate.

Further, compounds other than those represented by Formula (VIII) or (IX) such as tris(pentafluorophenyl)boron, tris(3,5-di(trifluoromethyl)phenyl)boron and triphenylboron, can be also used.

Organic aluminum compounds as Component (C) include those represented by the following formula (X), (XI) or (XII):

$$R^{12}{}_rAlQ_{3-r} \qquad (X)$$

wherein $R^{12}$ is a hydrocarbon group such as an alkyl group, alkenyl group, aryl group or arylalkyl group having 1 to 20, preferably 1 to 12 carbon atoms; Q is a hydrogen atom, a $C_{1-20}$ alkoxy group or a halogen atom; and r is a number between 1 and 3.

Examples of compounds represented by Formula (X) are, for example, trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydroide, diethylaluminum hydride and ethylaluminumsesquichloride.

Chain aluminoxanes represented by the following Formula (XI):

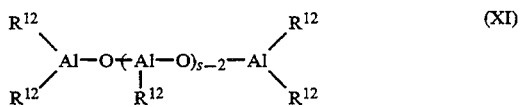

wherein $R^{12}$ is as defined in Formula (X); and s is a degree of polymerization, usually from 3 to 50, preferably 7 to 40.

Cyclic alkylaluminoxanes having a repeating unit represented by the formula:

wherein $R^{12}$ is defined in Formula (X); and s is a degree of polymerization, usually from 3 to 50, preferably 7 to 40.

Of these compounds represented by Formulas (X) to (XII), preferable compounds are an aluminum compound containing at least one alkyl group having at least three carbon atoms, particularly a branched alkyl group and aluminoxanes. Particularly preferred are triisobutylaluminum and aluminoxanes with a polymerization degree of at least 7. Use of triisobutylaluminum, aluminoxane with polymerization degree of at least 7 or a mixture thereof gives higher activity than use of trimethylaluminum or triethylaluminum.

Methods of preparing the above aluminoxanes are not particularly limited to, but include any known methods such as a process comprising contacting alkylaluminum with a condensation agent such as water. Alkylaluminum and a condensation agent can be reacted by known methods, for example, (1) a method comprising dissolving an organoaluminum compound in an organic solvent, and contacting the solution with water; (2) a method comprising adding an organoaluminum compound to starting materials for polymerization, and adding water to the reaction mixture later; (3) a method comprising reacting an organoaluminum compound with crystalline water contained in a metal salt and the like or water adsorbed to an inorganic material or an organic material; (4) a method comprising reacting tetraalkyldialuminoxane with trialkylaluminum, and then reacting the reaction product with water.

Catalysts which can be used in the present invention comprise, as main ingredients, the above Components (A), (B) and (C). Further, the catalysts comprising, as main ingredients, Component (A1) as Component (A) and Component (B) can be used.

In this case, the use conditions are not limited; however it is preferable to adjust a ratio (molar ratio) of Component (A) to Component (B) to 1:0.01 to 1:100, more preferably 1:0.5 to 1:10, most preferably 1:1 to 1:5. Further, reaction temperature may preferably range from −100° to 250° C. Reaction pressure and reaction time can be appropriately selected.

Further, the amount of Component (C) used may be from 0 to 2,000 moles, preferably from 5 to 1,000 moles, most preferably from 10 to 500 moles, per 1 mol of Component (A). The use of Component (C) may improve polymerization activity. However, the use of excess amount of Component (C) is not desirable since a great amount of the organoaluminum compound will remain in the resultant polymer.

In addition, a way of using the catalysts is not particularly limited. For example, it is possible that Components (A) and (B) are preliminary reacted and the reaction product is separated, washed and used for polymerization. It is also possible that Components (A) and (B) themselves are contacted in a polymerization system. Further, Component (C) can be contacted with Component (A), Component (B), or the reaction product of Component (A) and Component (B). These components can be contacted before polymerization or during polymerization. Further, these components can be added to monomers or a solvent before polymerization, or to the polymerization system.

In the present invention, an alpha-olefin can be homopolymerized, or two or more of alpha-olefins can be co-polymerized in the above-mentioned polymerization system.

In this case, the alpha-olefins are not particularly limited to, but include those represented by the following Formula (XIII):

$$R^{13}-CH=CH_2 \qquad (X)$$

wherein $R^{13}$ is an alkyl group having 1 to 28, preferably 2 to 20, carbon atoms.

More specifically, suitable alpha-olefins include, for example, ethylene, propylene, 1-butene, 3-methyl-1-butene, 1-hexene, 4-methyl-1-pentene, 1-octene, 1-decene, 1-dodecene, 1-tetradecene, 1-hexadecene, 1-octadecene and 1-eicosene.

In the present invention, when two or more of alpha-olefins are copolymerized, any combination of the above monomers can be used. However, it is particularly preferable to copolymerize ethylene and an alpha-olefin having 3 to 10 carbon atoms. In this case, a molar ratio of ethylene to the other alpha-olefin may be 99.9:0.1 to 0.1:99.9.

In the present invention, in addition to the above alpha-olefins, it is possible to copolymerize a small amount of other unsaturated compounds such as vinyl aromatic compounds such as styrene, p-methylstyrene, isopropylstyrene and t-butylstyrene, and chain diolefins such as butadiene, isoprene and 1,5-hexadiene. In general, the other unsaturated compounds are used in an amount of 20 mole percent based on the amount of the alpha-olefin used. In this case, at least one alpha-olefin is preferably used.

Polymerization methods are not particularly limited to, but include bulk polymerization, solution polymerization, suspension polymerization and gas phase polymerization. In addition, either of a batch process or a continuous process can be used.

As for polymerization conditions, the polymerization temperature may range from −100° to 250° C., preferably from −50° to 200° C. Further, the catalyst is preferably used in an amount to provide a starting monomer/Component (A) molar ratio or a starting monomer/Component (B) molar ratio of from 1 to $10^9$, preferably from 100 to $10^7$. The polymerization time may usually range from 1 minute to 10 hours. The reaction pressure may range from normal pressure to 100 Kg/cm²G, preferably from normal pressure to 50 Kg/cm²G.

The molecular weight of the resultant polymer can be controlled by appropriately selecting the amount of each catalyst component and polymerization temperature, or by a polymerization reaction in the presence of hydrogen.

In the case of using polymerization solvents, suitable solvents include aromatic hydrocarbons such as benzene, toluene, xylene and ethylbenzene; alicyclic hydrocarbons such as cyclopentane, cyclohexane and methylcyclohexane; aliphatic hydrocarbons such as pentane, hexane, heptane and octane; and halogenated hydrocarbons such as chloroform and dichloromethane. These solvents can be used alone or in combination. Monomers such as alpha-olefins can also be used as solvent.

EXAMPLES

The present invention will be described in more detail with reference to the following Examples and Comparative Examples, which are not used to limit the present invention.

In the Examples and Comparative Examples, physical properties were measured as follows.

Mw, Mn, Mw/Mn

In Examples 1 to 16, these were measured at 135° C. by the Gel Permeation Chromatography (GPC) using 1,2,4-trichlorobenzene as a solvent and polyethylene as standard polymer.

In Examples 17 to 28, these were measured at 135° C. by GPC using 1,2,4-trichlorobenzene as a solvent and polystyrene as standard polymer.

Melting Point (Tm)

The melting point was measured by DSC analysis.

Intrinsic Viscosity [η]

The intrinsic viscosity was measured in decalin at 135° C.

Propylene Content

The propylene content was measured by $^{13}$C-NMR.

Octene Content

The octene content was measured by $^{1}$H-NMR.

Syndiotactic Index

The syndiotactic index was measured by $^{13}$C-NMR.

EXAMPLE 1

(1) Synthesis of [Cp₂Fe][B(C₆F₅)₄] (synthesized in accordance with techniques described in Jolly, W. L. The Synthesis and Characterization of Inorganic Compounds; Prentice-Hall: Englewood Cliffs, N.J., 1970, P487):

Ferrocene (3.7 g, 20.0 mmol) was reacted with 40 ml of concentrated sulfuric acid at room temperature for one hour to obtain very dark blue solution. The obtained solution was placed in 1 litter of water with agitation to obtain slightly dark blue solution. The obtained solution was added to 500 ml of an aqueous solution of Li[B($C_6F_5$)$_4$] (13.7 g, 20.0 mmol: Synthesized in accordance with a process described in J. Organometal. Chem., 2 (1964) 245). The light blue precipitate was taken by filtaration and then washed with 500 ml of water five times. Then, the washed product was dried under reduced pressure to obtain 14.7 g of the target product, [ferrocenium tetrakis(pentafluorophenyl)borate.

(2) Ethylene Polymerization:

A 1 litter autoclave which was dried and purged with nitrogen, was charged with 400 ml of toluene, 0.2 mmol of triisobutylaluminum, 0.01 mmol of the ferrocenium tetrakis(pentafluorophenyl)borate obtained as above, 0.01 mmol of bis(cyclopentadienyl)dimethylzirconium. Then, the polymerization was carried out at 60° C. for 1 hour while ethylene was continuously introduced so as to keep an inner pressure to 10 Kg/cm². As a result, 180 g of polyethylene were obtained. The polymerization activity per 1 g of aluminum used, was 33 Kg/gAl.

The obtained polymer had a Mw of 193,000 and a Mw/Mn of 3.99.

EXAMPLE 2

The procedures of Example 1 were repeated except that ehylenebis(indenyl)dimethylzirconium was used instead of bis(cyclopentadienyl)dimethylzirconium; ethylene 10 Kg/cm² was changed to propylene 7 Kg/cm²; the polymerization temperature was changed to 30° C.; and the polymerization time was changed to 1 hour. As a result, 10.3 g of polypropylene were obtained.

It was confirmed by IR and $^{13}C$-NMR that the obtained polymer was isotactic polypropylene.

In addition, the obtained polymer had a Mw of 23,000, a Mw/Mn of 2.64 and a melting point of 142.6° C.

EXAMPLE 3

The procedures of Example 2 were repeated except that 1 Kg/cm² of propylene was introduced instead of 7 Kg/cm² of propylene; and ethylene was continuously added to keep an inner pressure of 2 Kg/cm². As a result, 14.0 g of an ethylene/propylene copolymer were obtained.

It was confirmed that the obtained product was a copolymer since a broad melting point at around 90° C. was observed by DSC analysis.

In addition, the obtained copolymer had a propylene content of 35.0 mol %, a Mw of 54,000 and a Mw/Mn of 3.27.

EXAMPLE 4

The procedures of Example 1 were repeated except that 0.01 mmol of tetrabenzylzirconium were used instead of 0.01 mmol of bis(cyclopentadienyl)dimethylzirconium; and the polymerization time was changed to 3 hours. As a result, 48 g of polyethylene were obtained.

The obtained polymer had a Mw of 286,000 and a Mw/Mn of 3.35.

EXAMPLE 5

The procedures of Example 4 were repeated except that bis(2,5-di-t-butylphenoxy)dimethylzirconium was used instead of tetrabenzylzirconium. As a result, 35 g of polyethylene were obtained.

The obtained polymer had a Mw of 355,000 and a Mw/Mn of 3.50.

EXAMPLE 6

A one litter continuous type autoclave was charged with toluene as a solvent at 1 litter/hr, ethylene and propylene at an ethylene/propylene ratio of 29/71 (molar ratio) at a flow rate of 3.75 litter/min. and, as catalyst components, bis(cyclopentadienyl)zirconium dimethyl at 0.01 mmol/hr, ferrocenium tetrakis(pentafluorophenyl)borate at 0.01 mmol/hr and triisobutylaluminum at 0.2 mmol/hr. Then polymerization was carried out at 55° C. while the total pressure was controlled to keep 8 Kg.cm².

As a result, an ethylene/propylene copolymer was obtained at a rate of 72 g/hr. The polymerization activity per 1 g of aluminum used, was 13.3 Kg/gAl.

In addition, the obtained copolymer had an intrinsic viscosity of 0.60 dl/g and a propylene content of 32.3 wt. %.

COMPARATIVE EXAMPLE 1

The procedures of Example 1 were repeated except that triisobutylaluminum was not used; and the polymerization time was changed to 3 hours.

As a result, 0.04 g of a polymer were obtained.

COMPARATIVE EXAMPLE 2

The procedures of Example 1 were repeated except that ferrocenium tetrakis(pentafluorophenyl)borate was not used; and the polymerization time was changed to 3 hours.

As a result, a polymer was not obtained.

COMPARATIVE EXAMPLE 3

The procedures of Example 1 were repeated except that 0.2 mmol of aluminoxane (degree of polymerization: 20) were used instead of 0.2 mmol of triisobutylaluminum; and ferrocenium tetrakis(pentafluorophenyl)borate was not used.

As a result, 7 g of a polymer were obtained.

EXAMPLE 7

(1) Preparation of Dimethylsilylenebis(2,3,5-trimethylcyclopentadienyl)dichlorozirconium:

In a 300 ml glass reaction vessel, 7.2 g of dimethylbis(2,3,5-trimethylcyclopentadienyl)silane were dissolved in 100 ml of tetrahydrofuran. To the obtained solution, 52.8 ml of a hexane solution of n-butyllithium were added dropwise at 0° C. The solution was further stirred at room temperature for 3 hours to obtain yellow suspension.

Further, in a 500 ml glass reaction vessel, zirconium tetrachloride was cooled to −78° C. and dichloromethane was added. To this, the previous lithium salt was added dropwise to heat to room temperature. Then, the heat refluxing was carried out for 40 hours. After cooling, the precipitate portion was removed to concentrate the yellow solution. Then, a light yellow solid was obtained by addition of hexane. The obtained solid was subjected to recrystallization from dichloromethane/hexane to obtain 0.4 g of a white crystal of dimethylsilylbis(2,3,5-trimethylcyclopentadienyl)zirconium dichlorid.

(2) Propylene Polymerization:

A two litter autoclave sufficiently purged with nitrogen, was charged with 400 ml of toluene, 0.01 mmol of triisobutylalumihum, 0.005 mmol of ferrocenium tetrakis(pentafluoro)borate and 0.005 mmol of dimethylsilyl(2,3,5-trimethylcyclopentadienyl)zirconium dichloride. Propylene was introduced into the autoclave to keep a total pressure of 3 Kg.cm$^2$. Then, the polymerization was carried out for 2 hours. After reaction, the catalyst components were decomposed by methanol and the obtained polymer was dried, to obtain 20.0 g of isotactic polypropylene.

The polymerization activity was 22 Kg/gZr. In addition the obtained polymer had a Mw of 120,000 and a melting point of 162.0° C.

Comparative Example 4

A two litter autoclave sufficiently purged with nitrogen, was charged with 400 ml of toluene, 0.005 mmol of ferrocenium tetrakis(pentafluoro)borate and 0.005 mmol of dimethylsilyl(2,3,5-trimethylcyclopentadienyl)zirconium dichloride. Propylene was introduced into the autoclave to keep a total pressure of 3 Kg.cm$^2$. Then, the polymerization was carried out for 2 hours. After reaction, the catalyst components were decomposed by methanol. However, almost no polymer was obtained.

EXAMPLE 8

(1) Preparation of Dimethylanilinium Tetrakis(pentafluorophenyl)borate:

Pentafluorophenyllithium prepared from 152 mmol of bromopentafluorobenzene and 152 mmol of butyllithium was reacted with 45 mmol of boron trichloride in hexane, to obtain tri(pentafluorophenyl)boron as a white solid product.

The obtained tris(pentafluorophenyl)boron (41 mmol) was reacted with 41 mmol of pentafluorophenyllithium, to isolate lithium tetrakis(pentafluorophenyl)borate as a white solid product.

Thereafter, lithium tetrakis(pentafluorophenyl)borate (16 mmol) was reacted with dimethylaniline hydrochloride (16 mmol) in water, to obtain 11.4 mmol of dimethylanilinium tetrakis(pentafluorophenyl)borate as a white solid product.

It was confirmed by $^1$H-NMR and $^{13}$C-NMR that the reaction product was the target product.

(2) Copolymerization of Ethylene/1-Octene

A one litter autoclave which was dried and purged with nitrogen, was charged with 400 ml of toluene, 0.6 mmol of triisobutylaluminum, 6 μmol of bis(cyclopentadienyl)zirconium dichloride, and 6 μmol of dimethylanilinium tetrakis(pentafluorophenyl)borate obtained in Step (1) above in this order. Then, 31 mmol (0.2 mol) of octene were added. After the reaction mixture was heated to 70° C. the polymerization was carried out for 30 minutes while continuously introducing ethylene so as to keep the ethylene partial pressure to 3 Kg/cm$^2$. As a result, 72.1 g of an ethylene/1-octene copolymer were obtained.

The polymerization activity was 132 Kg/gZr. In addition, the obtained copolymer had an octene content of 2 mol %; a density of 0.919 g/cm$^2$; an intrinsic viscosity of 1.89 dl/g, a Mw of 90,600, a Mw/Mn of 2.15 and a melting point of 112° C.

EXAMPLE 9

The procedures of Example 8 were repeated except that triethylaluminum (0.6 mmol) was used instead of triisobutylaluminum (0.6 mmol) in the polymerization, to obtain 5.7 g of an ethylene/1-octene copolymer.

The polymerization activity was 10.0 Kg/gZr. In addition, the obtained copolymer had an octene content of 1.5 mol %, an intrinsic viscosity of 3.27 dl/g and a melting point of 120° C.

EXAMPLE 10

A one litter autoclave was charged with 400 ml of toluene, 1.0 mmol of triisobutylaluminum, 6 μmol of zirconium tetrachloride and 9 μmol of dimethylanilinium tetrakis(pentafluorophenyl)borate in this order. Then, 31 mmol (0.2 mol) of octane were added. After the reaction mixture was heated to 90° C., the polymerization was carried out for 30 minutes while continuously introducing ethylene so as to keep the ethylene partial pressure to 9 Kg/cm$^2$. As a result, 7.35 g of an ethylene/1-octene copolymer were obtained.

The polymerization activity was 13 Kg/gZr. In addition, the obtained copolymer had an octene content of 1 mol %; an intrinsic viscosity of 6.05 dl/g and a melting point of 126° C.

EXAMPLE 11

The procedures of Example 9 were repeated except that 6 μmol of tetrabutoxyzirconium were used instead of zirconium tetrachloride in the polymerization, to obtain 1.88 g of an ethylene/1-octene copolymer.

The polymerization activity was 13 Kg/gZr. In addition, the obtained copolymer had an octene content of 1 mol %, an intrinsic viscosity of 2.87 dl/g and a melting point of 131° C.

EXAMPLE 12

The procedures of Example 9 were repeated except that 6 μmol of tetrabenzylzirconium were used instead of zirconium tetrachloride in the polymerization, to obtain 10.3 g of an ethylene/1-octene copolymer.

The polymerization activity was 19 Kg/gZr. In addition, the obtained copolymer had an octene content of 3 mol %, an intrinsic viscosity of 2.61 dl/g and a melting point of 105° C.

EXAMPLE 13

The procedures of Example 9 were repeated except that 9 μmol of hafnium tetrachloride was used instead of zirconium tetrachloride in the polymerization, to obtain 7.09 g of an ethylene/1-octene copolymer.

The polymerization activity was 4.41 Kg/gZr. In addition, the obtained copolymer had an octene content of 2 mol %, an intrinsic viscosity of 6.57 dl/g and a melting point of 130° C.

EXAMPLE 14

The procedures of Example 9 were repeated except that octene was not used; after heating to 90° C., propylene was introduced to keep its partial pressure of 2 Kg/cm$^2$, and then ethylene was introduced to keep its partial pressure of 7 Kg/cm$^2$ in the copolymerization. As a result, 2.4 g of an ethylene/propylene copolymer were obtained.

The polymerization activity was 4.39 Kg/gZr. In addition, the obtained copolymer had a propylene content of 12 mol %, an intrinsic viscosity of 2.91 dl/g and a melting point of 129° C.

EXAMPLE 15

A one litter autoclave which was dried and purged with nitrogen, was charged with 400 ml of toluene, 1 mmol of triisobutylaluminum, 0.01 mmol of tetrabenzylzirconium and 0.01 mmol of tris(pentafluorophenyl)boron. Then, the polymerization was carried out at an inner temperature of 80° C. for 1 hour while continuously introducing ethylene into the autoclave so as to keep the ethylene partial pressure to 7 Kg/cm$^2$. As a result, 0.65 g of polyethylene were obtained.

The polymerization activity was 0.71 Kg/gZr. In addition, the obtained polymer had an intrinsic viscosity of 7.24 dl/g.

EXAMPLE 16

The procedures of Example 15 were repeated except that 0.01 mmol of dimethylanilinium tetrakis(pentafluorophenyl)borate were used instead of tris(pentafluorophenyl)boron, to obtain 18.09 g of polyethylene.

The polymerization activity was 20 Kg/gZr. In addition, the obtained copolymer had an intrinsic viscosity of 7.88 dl/g.

EXAMPLE 17

The procedures of Example 16 were repeated except that 1 mmol of triethylaluminum was used instead of triisobutylaluminum; and the polymerization time was changed to 20 minutes in the polymerization. As a result, 12.26 g of polyethylene were obtained.

The polymerization activity was 13 Kg/gZr. In addition, the obtained copolymer had an intrinsic viscosity of 4.11 dl/g.

EXAMPLE 18

The procedures of Example 16 were repeated except that 1 mmol of methylaluminoxane (degree of polymerization: 20) was used instead of triisobutylaluminum in the polymerization. As a result, 16.3 g of polyethylene were obtained.

The polymerization activity was 18 Kg/gZr. In addition, the obtained copolymer had an intrinsic viscosity of 7.27 dl/g.

EXAMPLE 19

A one litter autoclave which was dried and purged with nitrogen, was charged with 400 ml of toluene, 0.1 mmol of tetrabenzylzirconium and 0.1 mmol of dimethylanilinium tetrakis(pentafluorophenyl)borate. Then, the polymerization was carried out at an inner temperature of 80° C. for 90 minutes while continuously introducing ethylene into the autoclave so as to keep the ethylene partial pressure to 9 Kg/cm$^2$. As a result, 0.94 g of polyethylene were obtained.

The polymerization activity was 0.10 Kg/gZr. In addition, the obtained polymer had an intrinsic viscosity of 2.44 dl/g.

EXAMPLE 20

(1) Synthesis of [Cp$_2$Fe][B(C$_6$F$_5$)$_4$]:

In the same manner as in Example 1 (1), ferrocenium tetrakis(pentafluorophenyl)borate was synthesized.

(2) Polymerization:

A stainless autoclave was charged with 30 ml of dried toluene, 0.002 mmol of the ferrocenium tetrakis(pentafluorophenyl)borate obtained as above, and 0.002 mmol of methylphenylmethylene(cyclopentadienyl)zirconium dimethyl. Then, 500 ml of liquid propylene was added and the polymerization was carried out at 70° C. for 1 hour. As a result, 0.5 g of syndiotactic polypropylene were obtained. The polymerization activity was 2.7 Kg/gZr.

The obtained syndiotactic polypropylene had a Mw of 311,000, a Mn of 135,000, a Mw/Mn of 2.3 and a syndiotactic index (racemi-diad) of 94%.

EXAMPLE 21

A stainless autoclave was charged with 30 ml of dried toluene, 0.1 mmol of triisobutylaluminum, 0.002 mmol of the ferrocenium tetrakis(pentafluoro-phenyl)borate obtained as above, and 0.002 mmol of methylphenylmethylene(cyclopentadienyl)zirconium dimethyl. Then, 500 ml of liquid propylene were added and the polymerization was carried out at 70° C. for 1 hour. As a result, 22 g of syndiotactic polypropylene were obtained. The polymerization activity was 121 Kg/gZr.

The obtained syndiotactic polypropylene had a Mw of 485,000, a Mn of 211,000, a Mw/Mn of 2.3 and a syndiotactic index (racemi-diad) of 95%.

EXAMPLE 22

The procedures of Example 21 were repeated except that 0.002 mmol of diphenylmethylene(cyclopentadienyl)(9-fluorenyl)zirconium dimethyl were used instead of methylphenylmethylene(cyclopentadienyl)(9-fluorenyl)zirconium dimethyl. As a result, 28 g of syndiotactic polypropylene were obtained. The polymerization activity was 154 Kg/gZr.

The obtained syndiotactic polypropylene had a Mw of 453,000, a Mn of 162,000, a Mw/Mn of 2.8 and a syndiotactic index (racemi-diad) of 96%.

EXAMPLE 23

The procedures of Example 21 were repeated except that 0.002 mmol of cyclohexylidene(1,1-cyclopentadienyl)(9-fluorenyl)zirconium dimethyl were used instead of methylphenylmethylene(cyclopentadienyl)(9-fluorenyl)zirconium dimethyl. As a result, 25 g of syndiotactic polypropylene were obtained. The polymerization activity was 137 Kg/gZr.

The obtained syndiotactic polypropylene had a Mw of 525,000, a Mn of 210,000, a Mw/Mn of 2.5 and a syndiotactic index (racemi-diad) of 96%.

EXAMPLE 24

The procedures of Example 23 were repeated except that 0.002 mmol of triethylammonium tetrakis(pentafluorophenyl)borate were used instead of ferrocenium tetrakis(pentafluorophenyl)borate. As a result, 23 g of syndiotactic polypropylene were obtained. The polymerization activity was 126 Kg/gZr.

The obtained syndiotactic polypropylene had a Mw of 420,000, a Mn of 150,000, a Mw/Mn of 2.8 and a syndiotactic index (racemi-diad) of 94%.

EXAMPLE 25

The procedures of Example 23 were repeated except that the polymerization temperature was changed from 70° C. to 40° C., to obtain 3.5 g of syndiotactic polypropylene. The polymerization activity was 19 Kg/gZr.

The obtained syndiotactic polypropylene had a Mw of 895,000, a Mn of 280,000, a Mw/Mn of 3.2 and a syndiotactic index (racemi-diad) of 98%. In addition, the melting point was 145° C.

EXAMPLE 26

The procedures of Example 22 were repeated except that 0.002 mmol of diphenylmethylene(cyclopentadienyl)(9-fluorenyl)hafnium dimethyl were used instead of diphenylmethylene(cyclopentadienyl)(9-fluorenyl)zirconium dimethyl. As a result, 22 g of syndiotactic polypropylene were obtained. The polymerization activity was 62 Kg/gHf.

The obtained syndiotactic polypropylene had a Mw of 513,000, a Mn of 160,000, a Mw/Mn of 3.2 and a syndiotactic index (racemi-diad) of 95%.

EXAMPLE 27

A stainless autoclave was charged with 30 ml of dried toluene, 0.1 mmol of triisobutylaluminum and 0.002 mmol of methylphenylmethylene(cyclopentadienyl)(9-fluorenyl)zirconium dichloride. After sufficient agitation, 0.002 mmol of Li[B($C_6F_5$)$_4$] were added and 500 ml of liquid propylene were further added. Then, the polymerization was carried out at 70° C. for 1 hour. As a result, 10 g of syndiotactic polypropylene were obtained. The polymerization activity was 54 Kg/gZr.

The obtained syndiotactic polypropylene had a Mw of 420,000, a Mn of 150,000, a Mw/Mn of 2.8 and a syndiotactic index (racemi-diad) of 93%.

EXAMPLE 28

A glass reaction vessel was charged with 50 ml of 4-methyl-1-pentene, 0.2 mmol of triisobutylaluminum, 0.01 mmol of anilinium tetrakis(pentafluorophenyl)borate and 0.01 mmol of isopropyl(cyclopentadienyl)(9-fluorenyl)zirconium dichloride. Then, the polymerization was carried out at 20° C. for 90 hours. As a result, 7.6 g of syndiotactic poly(4-methyl-1-pentene) were obtained. The polymerization activity was 8.3 Kg/gZr.

The obtained syndiotactic polypropylene had a Mw of 24,000, a Mn of 10,000, a Mw/Mn of 2.4, a syndiotactic index (racemi-pentad) of 91% and a melting point of 204° C.

Figure 2:
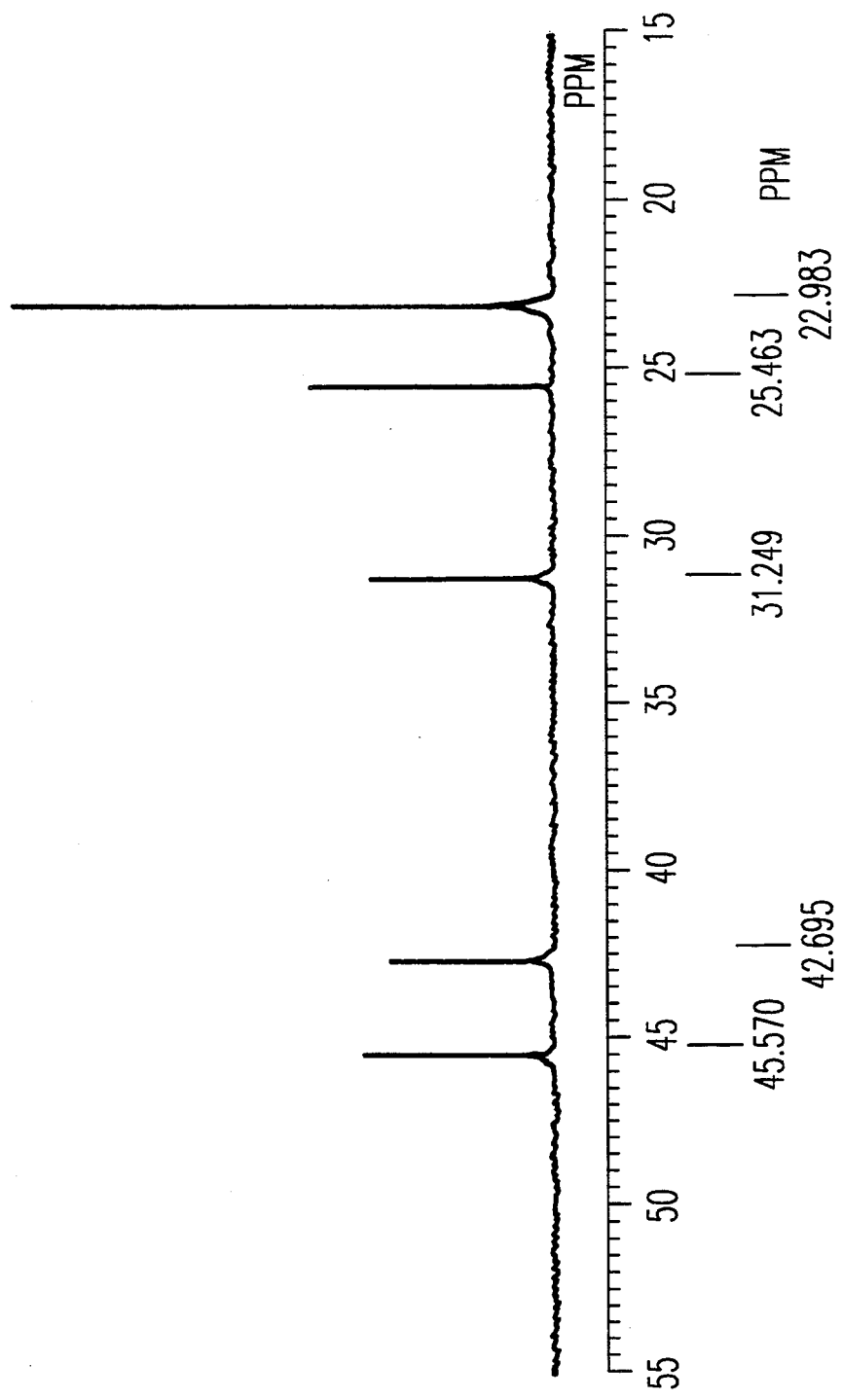
FIGS. 2 and 3 are each a NMR chart showing the measurement result of the polymer obtained in the example.

FIG. 2 shows the results of measurement of NMR[$^{13}$C{H}] for the obtained polymer. From the peak at 31.249 ppm in FIG. 2, it was found that the obtained polymer was a syndiotactic polymer.

EXAMPLE 29

The procedures of Example 28 were repeated except that 0.01 mmol of isopropyl(cyclopentadienyl)(9-fluorenyl)hafnium dichloride were used instead of isopropyl(cyclopentadienyl)(9-fluorenyl)zirconium dichloride. As a result, 3.5 g of syndiotactic poly(4-methyl-1-pentene) were obtained. The polymerization activity was 2.0 Kg/gHf.

The obtained polymer had a Mw of 32,000, a Mn of 12,000, a Mw/Mn of 2.7, a syndiotactic index (racemi-pentad) of 90% and a melting point of 202° C.

EXAMPLE 30

The procedures of Example 28 were repeated except that 20 mmol of 3-methyl-1-butene were used instead of 4-methyl-1-pentene, to obtain 2.3 g of syndiotactic poly(3-methyl-1-butene) were obtained. The polymerization activity was 2.5 Kg/gZr.

The obtained polymer had a Mw of 22,000, a Mn of 8,800, a Mw/Mn of 2.5, a syndiotactic index (racemi-pentad) of 90% and a melting point of 229° C.

Figure 3:
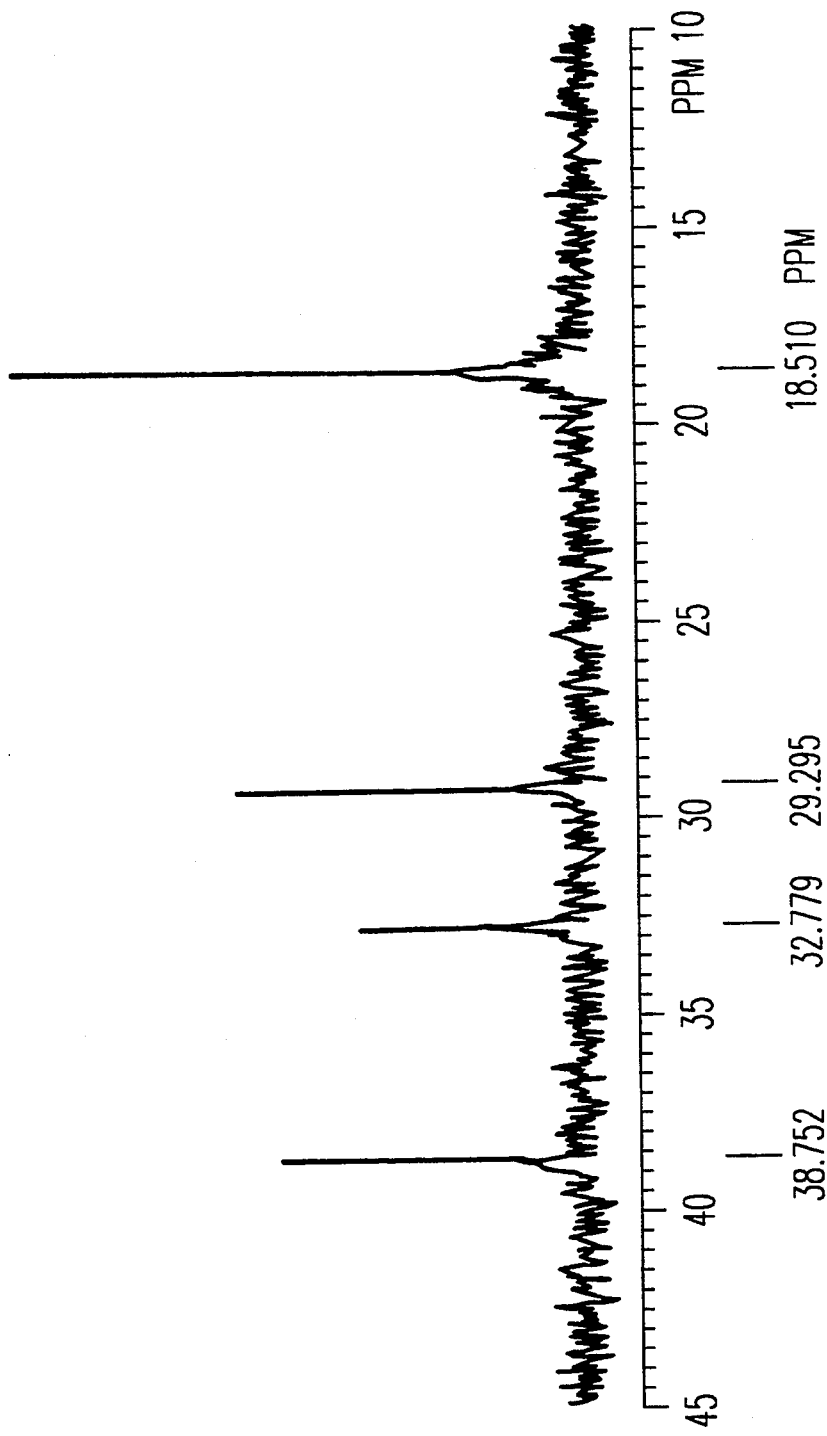

FIG. 3 shows the results of measurement of NMR[$^{13}$C{H}] for the obtained polymer. From the peak at 29.295 ppm in FIG. 3, it was found that the obtained polymer was a syndiotactic polymer.

EXAMPLE 31

The procedures of Example 28 were repeated except that 0.01 mmol of phenyl(methyl)methylene(cyclopentadienyl)(9-fluorenyl)zirconium dichloride were used instead of isopropyl(cyclopentadienyl)(9-fluorenyl)zirconium dichloride. As a result, 4.0 g of syndiotactic poly(4-methyl-1-pentene) were obtained. The polymerization activity was 2.2 Kg/gHf.

The obtained polymer had a Mw of 40,000, a Mn of 19,000, a Mw/Mn of 2.1, a syndiotactic index (racemi-pentad) of 92% and a melting point of 210° C.

EXAMPLE 32

A glass reaction vessel was charged with 50 ml of 4-methyl-1-pentene, 0.2 mmol of methylaluminoxane, 0.01 mmol of anilinium tetrakis(pentafluorophenyl)borate and 0.01 mmol of isopropyl(cyclopentadienyl)(9-fluorenyl)zirconium dichloride. Then, the polymerization was carried out at 20° C. for 90 hours. As a result, 7.0 g of syndiotactic poly(4-methyl-1-pentene) were obtained. The polymerization activity was 7.7 Kg/gZr.

EXAMPLE 33

A glass reaction vessel was charged with 50 ml of 4-methyl-1-pentene, 0.2 mmol of triethylaluminoxane, 0.01 mmol of anilinium tetrakis(pentafluorophenyl)borate and 0.01 mmol of isopropyl(cyclopentadienyl)(9-fluorenyl)zirconium dichloride. Then, the polymerization was carried out at 20° C. for 90 hours. As a result, 1.0 g of syndiotactic poly(4-methyl-1-pentene) was obtained. The polymerization activity was 1.1 Kg/gZr.

EXAMPLE 34

The procedures of Example 22 were repeated except that 0.002 mmol of diphenylmethylene(cyclopentadienyl)(9-fluorenyl)zirconium dimethyl were used instead of diphenylmethylene(cyclopentadienyl)(9-fluorenyl)zirconium dimethyl. As a result, 120 g of atactic polypropylene were obtained.

We claim:

1. A process for producing an olefin based polymer in which polymerization of one or more alpha-olefins of formula (XIII)

$$R^{13}-CH=CH_2$$

wherein $R^{13}$ is a hydrogen atom or an alkyl group having from 1 to 28 carbon atoms, is carried out in the presence of a catalyst comprising the compounds (A) and (B):

(A) a transition metal compound (A1) represented by the following formula:

$$M^1R^1_aR^2_bR^3_cR^4_d$$
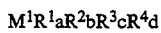

wherein $M^1$ is Ti, Zr or Hf, $R^1$, $R^2$, $R^3$ and $R^4$ are each independently hydrogen, oxygen, halogen, $C_{1-20}$ alkyl, $C_{1-20}$ alkoxy, $C_{6-20}$ aryl, $C_{6-20}$ aryloxy, alkylaryl, arylalkyl, $C_{1-20}$ acyloxy, allyl, trialkylsilyl, ether, thioether, ester, nitrile, amine, phosphine or acetylacetonate; a, b, c and d are each independently an integer of from 0 to 4; and two or more of $R^1$, $R^2$, $R^3$ and $R^4$ may form a ring; and (B) a compound capable of forming an ionic complex when reacted with said transition metal compound.

2. The process of claim 1, wherein said catalyst further comprises compound (C) an organoaluminum compound.

3. The process according to claim 2, wherein said organoaluminum compound (C) is a member selected from the group consisting of organoaluminum compounds containing at least one alkyl group having at least three carbon atoms and aluminoxanes.

* * * * *